United States Patent
Serkh et al.

(10) Patent No.: US 9,797,469 B1
(45) Date of Patent: Oct. 24, 2017

(54) ISOLATING DECOUPLER

(71) Applicant: GATES CORPORATION, Denver, CO (US)

(72) Inventors: Alexander Serkh, Troy, MI (US); Ilya Kleyman, Bloomfield Hills, MI (US); Essie Rahdar, Costa Mesa, CA (US)

(73) Assignee: GATES CORPORATION, Denver, CO (US)

( * ) Notice: Subject to any disclaimer, the term of this patent is extended or adjusted under 35 U.S.C. 154(b) by 0 days.

(21) Appl. No.: 15/154,678

(22) Filed: May 13, 2016

(51) Int. Cl.
| | |
|---|---|
| *F16H 9/00* | (2006.01) |
| *F16H 59/00* | (2006.01) |
| *F16H 61/00* | (2006.01) |
| *F16H 63/00* | (2006.01) |
| *F16D 3/00* | (2006.01) |
| *F16H 55/14* | (2006.01) |
| *F16H 55/36* | (2006.01) |
| *F16F 15/121* | (2006.01) |
| *F16H 7/08* | (2006.01) |

(52) U.S. Cl.
CPC ....... *F16F 15/1216* (2013.01); *F16H 7/0827* (2013.01); *F16H 55/36* (2013.01)

(58) Field of Classification Search
CPC .. F16H 55/36; F16H 2055/366; F16D 41/206; F16D 7/022; F16D 13/76
USPC ...................................... 474/94, 70
See application file for complete search history.

(56) References Cited

U.S. PATENT DOCUMENTS

| | | | | |
|---|---|---|---|---|
| 5,598,913 A * | 2/1997 | Monahan | .............. | F16D 41/206 192/41 S |
| 6,083,130 A * | 7/2000 | Mevissen | ................ | F02B 67/06 192/107 T |
| 7,624,852 B2 * | 12/2009 | Mevissen | ................ | F16D 7/022 192/41 S |
| 7,712,592 B2 * | 5/2010 | Jansen | ....................... | F16D 3/52 192/41 S |
| 7,766,774 B2 * | 8/2010 | Antchak | ................ | F16D 7/022 192/41 S |
| 7,798,928 B2 * | 9/2010 | Serkh | ....................... | F02B 67/06 474/152 |
| 7,975,821 B2 * | 7/2011 | Antchak | ................ | F16D 7/022 192/41 S |

(Continued)

FOREIGN PATENT DOCUMENTS

| | | |
|---|---|---|
| EP | 1764524 A1 | 3/2007 |
| EP | 2383490 A1 | 11/2011 |

(Continued)

OTHER PUBLICATIONS

European Patent Office, Notification of Transmittal of the International Search Report and Written Opinion of the International Searching Authority, or the Declaration, application No. PCT/US2017/030432, dated Jul. 17, 2017.

*Primary Examiner* — Henry Liu

(74) *Attorney, Agent, or Firm* — Jeffrey A. Thurnau, Esq.; Paul N. Dunlap, Esq.

(57) ABSTRACT

An isolating decoupler comprising a shaft, a pulley having a belt bearing portion, a one way clutch, a torsion spring, the torsion spring engaged between the pulley and the one-way clutch, and a single bearing disposed between the shaft and the pulley, the bearing comprising a radial centerline, the radial centerline aligned with a mid-line of the belt bearing portion.

5 Claims, 3 Drawing Sheets

(56) References Cited

U.S. PATENT DOCUMENTS

| | | | | | |
|---|---|---|---|---|---|
| 8,047,920 | B2* | 11/2011 | Jansen | ............... | F16D 3/52 464/60 |
| 8,302,753 | B2* | 11/2012 | Antchak | ............... | F16D 41/206 192/113.32 |
| 8,506,434 | B2* | 8/2013 | Harvey | ............... | F16D 47/02 192/41 R |
| 8,678,157 | B2* | 3/2014 | Ward | ............... | F16D 7/022 192/41 R |
| 8,888,622 | B2* | 11/2014 | Chen | ............... | F16D 41/206 474/74 |
| 8,931,610 | B2* | 1/2015 | Serkh | ............... | F16D 41/206 192/41 S |
| 9,068,608 | B2* | 6/2015 | Serkh | ............... | F16D 7/022 |
| 9,441,681 | B2* | 9/2016 | Williams | ............... | B60K 25/02 |
| 9,651,099 | B2* | 5/2017 | Antchak | ............... | F16D 41/206 |
| 2004/0014540 | A1* | 1/2004 | Dell | ............... | F16H 55/36 474/70 |
| 2008/0312015 | A1* | 12/2008 | Schebitz | ............... | F16F 15/121 474/94 |
| 2009/0176583 | A1* | 7/2009 | Dell | ............... | F16D 3/02 464/40 |
| 2009/0176608 | A1* | 7/2009 | Jansen | ............... | F02B 67/06 474/74 |
| 2011/0065537 | A1* | 3/2011 | Serkh | ............... | F16D 7/022 474/94 |
| 2013/0237351 | A1* | 9/2013 | Marion | ............... | B60K 25/02 474/70 |
| 2013/0324335 | A1* | 12/2013 | Chen | ............... | F16D 41/206 474/94 |
| 2014/0113755 | A1 | 4/2014 | Ward et al. | | |
| 2015/0041277 | A1* | 2/2015 | Boyes | ............... | B60K 25/02 192/80 |
| 2015/0075943 | A1* | 3/2015 | Williams | ............... | B60K 25/02 192/41 S |
| 2015/0260233 | A1* | 9/2015 | Boyes | ............... | F16H 55/36 474/94 |
| 2015/0276039 | A1* | 10/2015 | Williams | ............... | F16D 41/206 474/94 |
| 2015/0285366 | A1* | 10/2015 | Serkh | ............... | F16H 55/36 474/94 |
| 2015/0316138 | A1* | 11/2015 | Dell | ............... | B60K 25/02 474/91 |
| 2016/0091048 | A1* | 3/2016 | Tran | ............... | F16H 55/36 474/94 |

FOREIGN PATENT DOCUMENTS

| | | |
|---|---|---|
| WO | 2004011818 A1 | 2/2004 |
| WO | 2007121852 A1 | 11/2007 |
| WO | 2011160202 A1 | 12/2011 |

* cited by examiner

ISOLATING DECOUPLER

FIELD OF THE INVENTION

The invention relates to an isolating decoupler, and more particularly, to an isolating decoupler comprising a single bearing disposed between the shaft and the pulley, the bearing comprising a radial centerline, the radial centerline aligned with a mid-line of the belt bearing portion.

BACKGROUND OF THE INVENTION

Diesel engine use for passenger car applications is increasing due to the benefit of better fuel economy. Further, gasoline engines are increasing compression ratios to improve the fuel efficiency. As a result, diesel and gasoline engine accessory drive systems have to overcome the vibrations of greater magnitude from crankshafts due to above mentioned changes in engines.

Due to increased crankshaft vibration plus high acceleration/deceleration rates and high alternator inertia the engine accessory drive system is often experiencing belt chirp noise due to belt slip. This will also reduce the belt operating life.

Crankshaft isolators/decouplers and alternator decouplers/isolators have been widely used for engines with high angular vibration to filter out vibration in engine operation speed range and to also control belt chirp.

Representative of the art is WO2007121582A1 which discloses a one way isolator for high torque devices, such as alternator-starters, driven by a flexible drive means includes a hub and a sheave each of which includes at least one stop member. The hub and sheave are linked by a isolating spring and, via a bearing and/or bushing, can rotate with respect to each other to provide isolation, through the spring, from torque variations when torque is transferred from the flexible drive means to the device. When substantial amounts of torque are transferred from the device to the flexible drive means, the sheave rotates with respect to the hub to bring the stop members into contact such that the isolator then acts like a solid pulley to facilitate the transfer of the torque from the device.

What is needed is an isolating decoupler comprising a single bearing disposed between the shaft and the pulley, the bearing comprising a radial centerline, the radial centerline aligned with a mid-line of the belt bearing portion. The present invention meets this need.

SUMMARY OF THE INVENTION

The primary aspect of the invention is an isolating decoupler comprising a single bearing disposed between the shaft and the pulley, the bearing comprising a radial centerline, the radial centerline aligned with a mid-line of the belt bearing portion.

Other aspects of the invention will be pointed out or made obvious by the following description of the invention and the accompanying drawings.

The invention comprises an isolating decoupler comprising a shaft, a pulley having a belt bearing portion, a one way clutch, a torsion spring, the torsion spring engaged between the pulley and the one-way clutch, and a single bearing disposed between the shaft and the pulley, the bearing comprising a radial centerline, the radial centerline aligned with a mid-line of the belt bearing portion.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
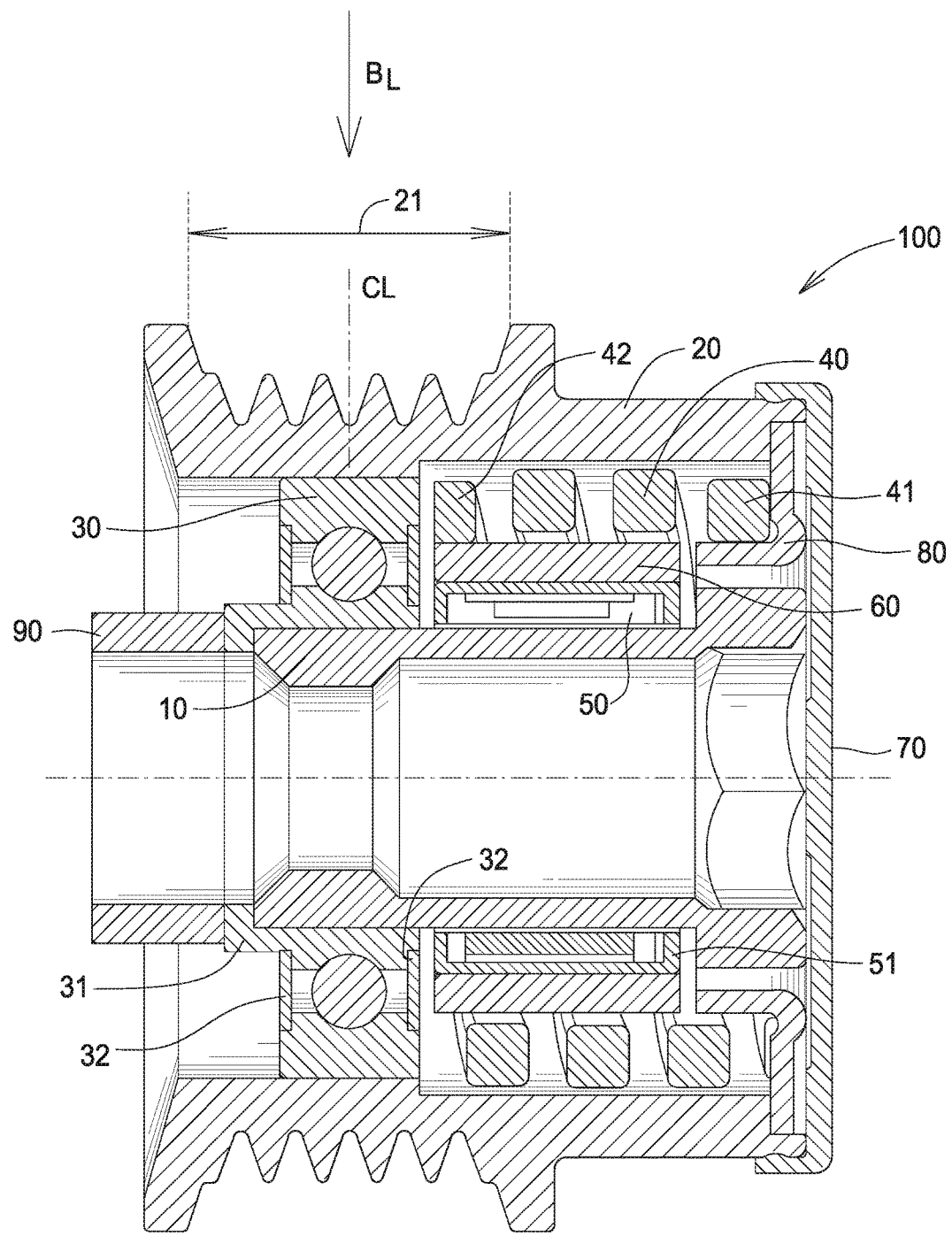
FIG. 1 is a cross-sectional view of the device.

FIG. 1 is a cross-sectional view of the device. The isolating decoupler comprises a shaft 10, pulley 20, bearing 30, torsion spring 40, one-way clutch 50, spring carrier 60 and dust shield 70.

Pulley 20 comprises a belt bearing portion 21. Belt bearing portion 21 engages a belt (not shown). The belt may comprise a multi-ribbed belt or single "v" belt.

Bearing 30 is press fit into pulley 20. Engaging portion 31 locates bearing 30 on the end of shaft 10. Engaging portion 31 comprises a radial projection which prevents axial movement of bearing 30 along shaft 10 once portion 31 contacts shaft 10. This in turn locates pulley 20 with respect to shaft 10.

A bearing radial centerline CL aligns with the mid-line of belt bearing portion 21. This alignment allows a belt load BL to be centered on the single bearing 30, thereby negating the need for a second bearing.

End plate 80 is press fit to pulley 20, but they may also be welded together. End 41 of torsion spring 40 is attached to end plate 80. End 41 may be attached using welding, adhesives or interference fit. Welding may comprise laser welding. Torsion spring 40 frictionally engages an outer surface of carrier 60. Carrier 60 comprises a cylindrical form which is press fit to an outer race 51 of one way clutch 50. End 42 of torsion spring 40 is frictionally engaged to carrier 60 using an interference fit. End 42 may also be welding or fixed by adhesives to carrier 60. One-way clutch 50 engages shaft 10.

Dust shield 70 prevents debris from entering the device. Bearing 30 comprises seals 32 for preventing debris from entering the bearing.

Spacer 90 locates the device 100 on a driven shaft (not shown). Spacer 90 abuts engaging portion 31 thereby fixing the location of bearing 30 with respect to shaft 10.

Figure 2:
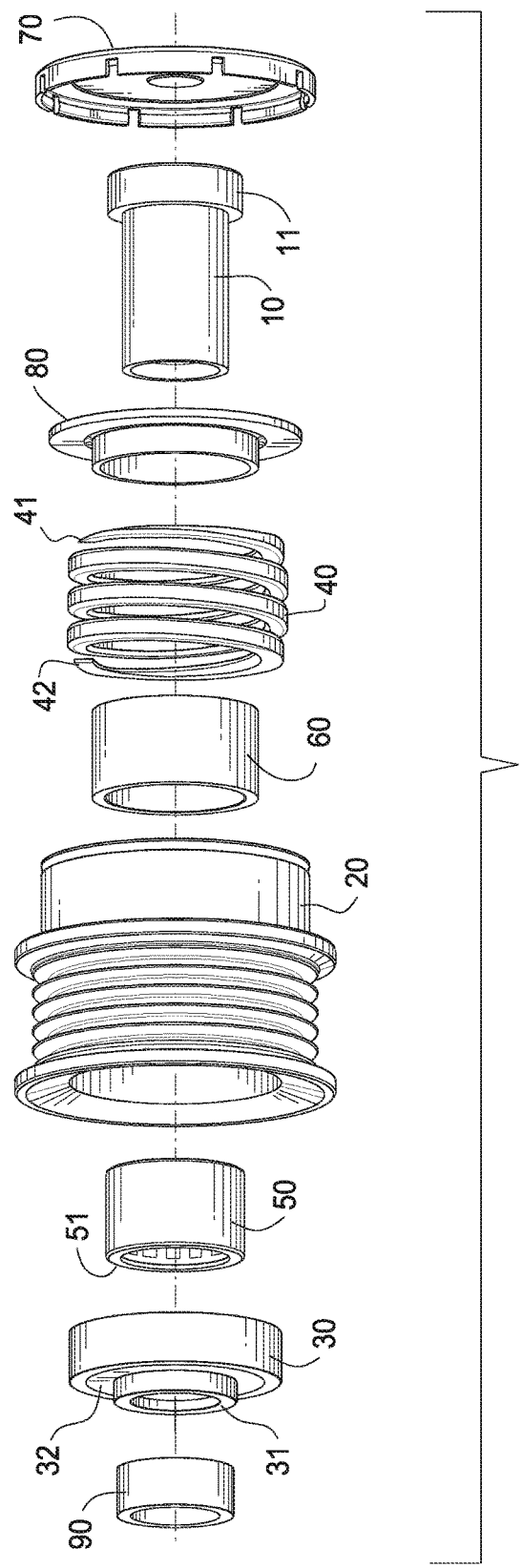
FIG. 2 is an exploded view of the device.

FIG. 2 is an exploded view of the device. Shoulder 11 locates the one way clutch 50. Bearing 30 traps one way clutch 50 between bearing 30 and shoulder 11, thereby preventing axial movement of one way clutch 50.

Figure 3:
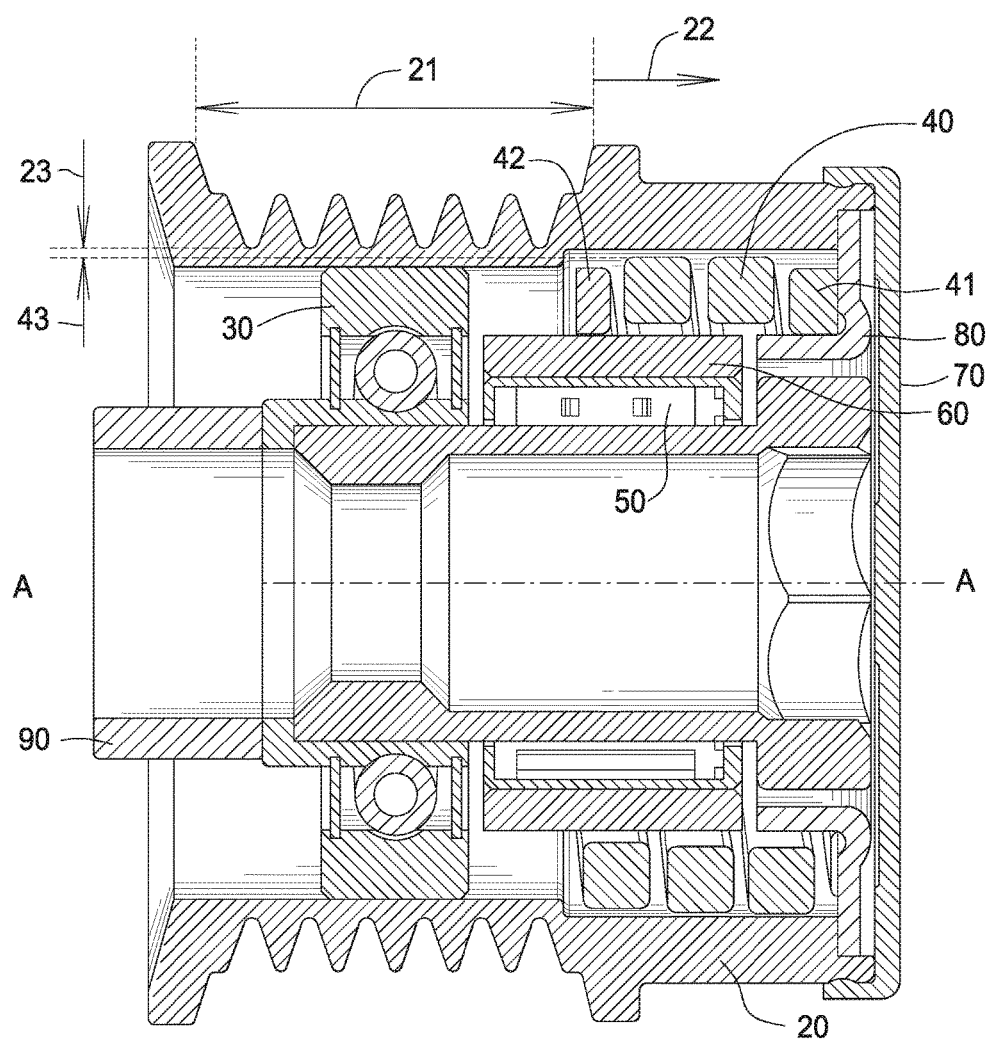
FIG. 3 is a cross-sectional view of an alternate embodiment.

FIG. 3 is a cross-sectional view of an alternate embodiment. In this embodiment torsion spring 40 is axially displaced 22 along axis A-A so that it is not radially under belt bearing portion 21, namely, torsion spring 40 is not radially between the belt bearing portion 21 and shaft 10. Spring 40 has a radius 43 with respect to axis A-A. Axially displacing spring 40 in this embodiment allows radius 23 of belt bearing portion 21 to be minimized. In effect the diameter of the device is governed by belt bearing portion 21 resting directly on the outer race of bearing 30. Radius 23 may be less than radius 43, equal to radius 43 or greater than radius 43 as may be required by a user.

Although forms of the invention have been described herein, it will be obvious to those skilled in the art that variations may be made in the construction and relation of parts without departing from the spirit and scope of the invention described herein.

We claim:

1. An isolating decoupler comprising:
   a shaft;
   a pulley having a belt bearing portion;
   a one way clutch;
   a torsion spring, the torsion spring connected to the pulley and directly frictionally engaged with an outer surface of the one-way clutch; and
   a single bearing disposed between the shaft and the pulley, the bearing comprising a radial centerline, the radial centerline aligned with a mid-line of the belt bearing portion.

2. The isolating decoupler as in claim 1, wherein the torsion spring is axially displaced so it is not radially between the belt bearing portion and the shaft.

3. The isolating decoupler as in claim 1 further comprising a dust shield on the pulley.

4. The isolating decoupler as in claim 1, wherein the torsion spring comprises an end which is welded to the pulley.

5. The isolating decoupler as in claim 1, wherein the single bearing comprises a radial projection which locates the single bearing on the shaft.

* * * * *